US012387580B2

(12) United States Patent
Britton et al.

(10) Patent No.: US 12,387,580 B2
(45) Date of Patent: Aug. 12, 2025

(54) CENTRAL STATION ALARM VERIFICATION SYSTEM AND METHOD

(71) Applicant: DIGITAL MONITORING PRODUCTS, INC., Springfield, MO (US)

(72) Inventors: Rick A. Britton, Springfield, MO (US); Jeffrey M. Britton, Springfield, MO (US); Kevin D. Ellison, Springfield, MO (US)

(73) Assignee: Digital Monitoring Products, Inc., Springfield, MO (US)

( * ) Notice: Subject to any disclaimer, the term of this patent is extended or adjusted under 35 U.S.C. 154(b) by 0 days.

(21) Appl. No.: 14/684,199

(22) Filed: Apr. 10, 2015

(65) Prior Publication Data

US 2016/0300465 A1 Oct. 13, 2016

(51) Int. Cl.

*G08B 13/196* (2006.01)
*G08B 25/00* (2006.01)
*G08B 29/18* (2006.01)

(52) U.S. Cl.

CPC . *G08B 13/19682* (2013.01); *G08B 13/19669* (2013.01); *G08B 13/19684* (2013.01); *G08B 13/19697* (2013.01); *G08B 25/001* (2013.01); *G08B 29/188* (2013.01)

(58) Field of Classification Search

CPC .... H04N 7/181; H04N 7/18; G08B 13/19656; G08B 25/14; G08B 13/19697; G08B 13/19695; G08B 25/008; G08B 25/08; G08B 25/10; G08B 13/19645; G08B 25/001; G08B 13/19684; G08B 13/19669; H04W 4/22; H04M 11/04; G06K 9/00771

See application file for complete search history.

(56) References Cited

U.S. PATENT DOCUMENTS

| | | | | |
|---|---|---|---|---|
| 6,281,790 | B1 | 8/2001 | Kimmel et al. | |
| 6,847,293 | B2 | 1/2005 | Menard et al. | |
| 7,679,507 | B2 | 3/2010 | Babich et al. | |
| 7,937,066 | B2 | 5/2011 | Kaltsukis | |
| 8,754,763 | B2 | 6/2014 | Morehead | |
| 8,862,092 | B2 | 10/2014 | Reitnour | |
| 9,495,860 | B2 | 11/2016 | Lett | |
| 2003/0062997 | A1* | 4/2003 | Naidoo ............ | G08B 13/19656 340/531 |
| 2011/0090334 | A1 | 4/2011 | Hicks, III et al. | |

(Continued)

*Primary Examiner* — Farhan Mahmud

(74) *Attorney, Agent, or Firm* — AVEK IP, LLC; Mark C. Young

(57) ABSTRACT

This disclosure relates to a system configured to facilitate remote verification of alarm events. Responsive to detection of an alarm event at a location of interest, clips of security video information and/or substantially real-time images may be presented to an end user on a user device associated with the end user, and/or to a reviewer via a central station, to facilitate determination of whether or not the detected alarm event is false. The system is configured to facilitate remote verification of alarm events by the end user and/or the reviewer while still protecting the privacy of the end user. The system may be configured to allow review of the clips and/or the substantially live images by the reviewer at the central station only responsive to detection of an alarm event, and only for a temporary period of time following the detection of the alarm event.

30 Claims, 5 Drawing Sheets

(56) References Cited

U.S. PATENT DOCUMENTS

| | | | | |
|---|---|---|---|---|
| 2012/0113265 | A1* | 5/2012 | Galvin | H04N 7/181<br>348/159 |
| 2012/0268603 | A1* | 10/2012 | Sarna | H04N 7/181<br>348/152 |
| 2014/0028783 | A1 | 1/2014 | Kaltsukis | |
| 2014/0327777 | A1 | 11/2014 | Jackson | |

* cited by examiner

CENTRAL STATION ALARM VERIFICATION SYSTEM AND METHOD

FIELD OF THE DISCLOSURE

This disclosure relates to a system configured to facilitate remote verification of alarm events.

BACKGROUND

Security systems configured to electronically monitor houses, businesses and other locations are known. Typically, responsive to detecting unauthorized entry and/or movement at a house or business, these systems generate an audible alarm and notify an alarm services provider of the unauthorized entry and/or movement. The alarm services provider may attempt to contact the owner of the house or business to verify whether or not there is an actual emergency that requires police, fire, and/or medical intervention. Often the alarm services provider is unable to contact the owner of the house or business and calls the police, requiring the police or security company to go to the location to determine if there was an actual emergency.

SUMMARY

One aspect of the disclosure relates to a system configured to facilitate remote verification of alarm events by an end user with a user device. In some implementations, the system may be configured such that security video information is received from one or more cameras monitoring a location of interest and/or other sources. A determination of whether or not an alarm even has occurred may be made for the location of interest based on the camera information. In some implementations, determining whether an alarm event has occurred for the location of interest includes receiving an indication that an alarm event has occurred from a security system (e.g., that includes the cameras) monitoring the location of interest. In some implementations, determining whether an alarm event has occurred for the location of interest includes determining one or more alarm event parameters based on the information from the security system; accessing alarm event criteria that describe alarm events at the location of interest; and detecting an alarm event responsive to one or more alarm event parameters satisfying one or more alarm event criteria.

In some implementations, the system may electronically record clips of security video information. Electronic recording of clips of security video information may be caused responsive to a determination that an alarm event has occurred. The clips of security video information may correspond to the one or more cameras monitoring the location of interest. An individual clip may comprise security video information from an individual camera for a period of time that corresponds to a time of the determined alarm event. In some implementations, at least one clip includes security video information from a period of time that includes the time of the determined alarm event. In some implementations, electronic recording of clips of security video information may include storing the one or more clips of security video information in non-transient electronic storage (e.g., on a server).

The system may cause a user device associated with an end user to present the clips to the end user. The user device may be configured to present clips to the end user in a selectable list of clips for the end user to review. In some implementations, the system may allow an end user to direct electronic storage of one or more of the clips in the selectable list for a predetermined period of time.

In some implementations, the system may cause the user device associated with the end user to present substantially real-time images to the end user for review. In some implementations, substantially real-time image information (e.g., electronic information included in a transmitted signal) for the one or more cameras may be generated and then the user device may be caused to present the real-time images based on the generated real-time image information. An individual substantially real-time image may be associated with an individual camera and show at least a portion of the location of interest. In some implementations, the substantially real-time images presented to the end user are streaming images from the one or more cameras. In some implementations, the substantially real-time images presented to the end user are updated up to about five times per second. However, this description of updating the substantially real-time images presented to the end user up to about five times per second is an example and is not intended to be limiting. The update speed may be determined and set by the system or manually. The speed may be based on system parameters or user preferences. The substantially real-time images presented to the end user may be updated and/or otherwise presented to the user at any rate that allows the system to function as described herein. In some implementations, the substantially real-time images presented to the end user are images updated responsive to requests from the end user. In some implementations, the system may allow the end user to direct electronic storage of one or more of the substantially real-time images for a predetermined period of time.

The system may facilitate determination of whether the alarm event is false or verified. The determination may be made by the end user. The determination may be made by the end user based on the clips, the substantially real-time images, and/or other information. The determination of whether the alarm event was false or verified may be communicated from the user device by the end user. The communication may be directed to a system server, a control panel, a central (e.g., review) station, and/or other devices.

Another aspect of the disclosure relates a system configured to facilitate remote verification of alarm events wherein the system includes a local security monitoring device, a server, a central station, a user device, and/or other components. The system may be configured to detect an alarm event for a location of interest. In some implementations, responsive to detecting the alarm event, the local security monitoring device may be configured to transmit an indication that the alarm event has been detected. The indication that the alarm event has been detected may be transmitted from the local security monitoring device to the server and/or the central station. In some implementations, the indication that the alarm event has been detected may be transmitted to the server via the central station. In some implementations, the indication that the alarm event has been detected may be transmitted to the central station via the server. In some implementations, the server may detect the alarm event and transmit the indication to the central station, the local security monitoring device, and/or other devices.

Security video information may be received by the server. The security video information may be associated with the alarm event and may be from one or more cameras monitoring the location of interest included in the local security monitoring device. The server may cause electronic recording of one or more clips of security video information from the one or more cameras. An individual clip may comprise security video information from an individual camera for a period of time that corresponds to a time of the alarm event. In addition, substantially real-time image information may be generated for the one or more cameras monitoring the location of interest. The substantially real-time image information may be and/or include one or more real time images of the location of interest and/or other information.

In some implementations, an indication that the alarm event has been detected may be received at the central station. In some implementations, the server may have a pre-determined electronic address, wherein, responsive to receiving the indication that the alarm event has been detected, the central station may request the substantially real-time image information and the selectable list of clips using the pre-determined electronic address. The server and/or the central station may facilitate determination by a reviewer at the central station of whether the detected alarm event is a false alarm event or a verified alarm event. In some implementations, the server may be configured to, responsive to a request from the central station, provide the real-time image information and a selectable list of the clips for display to the reviewer by the central station such that the determination by the reviewer is based on the clips and the real-time image information. The server may be configured such that the selectable list of clips and the real-time image information may be accessible to the reviewer via the central station for a pre-determined amount of time following the determined alarm event. In some implementations, the server and/or the central station may facilitate pan and tilt control of the one or more cameras by the reviewer using the central station during the pre-determined amount of time.

In some implementations, the server and/or the central station may be configured to facilitate electronic storage of one or more clips in the selectable list of clips by the reviewer using the central station so that the electronically stored clips remain accessible to the reviewer or other persons after the pre-determined amount of time expires. In some implementations, the server and/or the central station may facilitate emailing clips from the reviewer using the central station to an end user. In some implementations, responsive to direction from the end user via a user device associated with the end user, the system may be configured to electronically store one or more clips, one or more substantially real-time images, and/or other information on the server. In some implementations, the system may be configured to facilitate emailing clips, substantially real-time images, and/or other information from the reviewer using the central station to an end user. In some implementations, the system may facilitate manual clip and/or substantially real-time image recording by the end user (e.g., at any time), and/or by the reviewer during the pre-determined amount of time.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

In the following paragraphs, implementations of the present disclosure will be described in detail by way of example with reference to the accompanying drawings, which are not necessarily drawn to scale, and the illustrated components are not necessarily drawn proportionately to one another. Throughout this description, the implementations and examples shown should be considered as exemplars, rather than as limitations on the present disclosure. As used herein, the "present disclosure" refers to any one of the embodiments of the disclosure described herein, and any equivalents. Furthermore, reference to various aspects of the disclosure throughout this document does not mean that all claimed embodiments or methods must include the referenced aspects.

Figure 1:
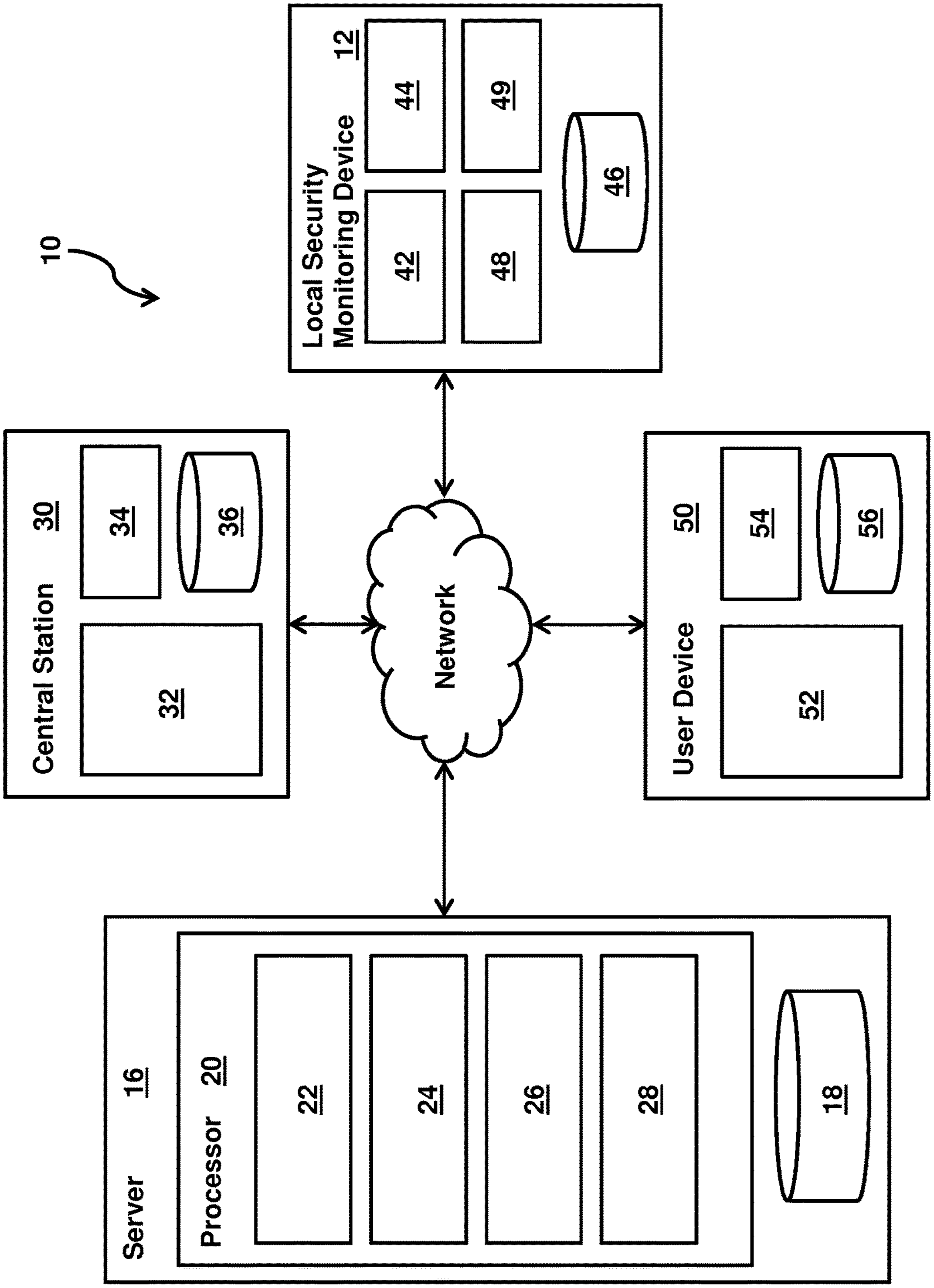
FIG. 1 illustrates a system configured to facilitate remote verification of alarm events.

FIG. 1 illustrates a system 10 configured to facilitate remote verification of alarm events. System 10 may be configured such that, responsive to detection of an alarm event at a location of interest, clips of security video information and/or substantially real-time images may be presented to an end user on a user device 50 associated with the end user, and/or to a reviewer via a central station 30, to facilitate determination of whether or not the detected alarm event is false or verified (i.e., an actual emergency). This allows the end user and/or the reviewer to determine whether or not the alarm event is false based on knowledge that is gained from viewing the clips and/or from substantially real-time views of the location of interest. System 10 may be configured to facilitate remote verification of alarm events by the end user and/or the reviewer while still protecting the privacy of the end user. System 10 may be configured to allow review of the clips and/or the substantially live images by the reviewer at central station 30 only responsive to detection of an alarm event, and only for a temporary period of time following the detection of the alarm event. System 10 may prevent reviewers at central station 30 from going back to the clips and/or substantially live images from cameras monitoring the location of interest at an unauthorized time.

In some implementations, the clips and/or the substantially real-time images may be generated and/or obtained by a server 16 of system 10. Server 16 may associate a pre-determined electronic (e.g., URL) address with the clips and/or the real-time images, wherein, responsive to receiving an indication that an alarm event has been detected, server 16 may post, and/or otherwise make available for viewing, the clips and/or the real-time images on a webpage that is linked from this pre-determined electronic address. The clips and/or real-time images may remain accessible at this pre-determined electronic address for a pre-determined amount of time. When the time expires the clips and/or real-time images may no longer be viewable via this electronic address (URL link). However, the clips may still remain stored on server 16 for archiving, evidentiary purposes, and/or other purposes, for example.

Responsive to receiving an indication of the alarm event, central station 30 may request the substantially real-time images and/or the clips using the pre-determined electronic address. For example, central station 30 may be pre-programmed with the electronic address (URL link) of (the clips and/or real-time image information on) server 16. Responsive to receiving the indication of the alarm event, the reviewer may click on a video link indicator presented to the reviewer by a user interface of central station 30 to view clips and/or real-time images of the location of interest that may aid a decision by the reviewer to dispatch assistance to the location of interest, or cancel the alarm. In some implementations, system 10 may comprise one or more of a local security monitoring device 12, server 16, central station 30, user device 50, and/or other components.

Local security monitoring device 12 may be configured to monitor the security of a location of interest and detect alarm events. In some implementations, local security monitoring device 12 may include one or more of a user interface 42, a processor 44, electronic storage 46, a sensor 48, a camera 49, and/or other components. The location of interest may be and/or include one or more structures such as a house, an office building, a warehouse, a garage, a restaurant and/or other businesses, a storage unit, a museum and/or other public buildings, and/or other structures; geographical areas such as fenced yards (e.g., a backyard, a company vehicle yard, etc.), parks, parking lots, and/or other geographical areas; and/or other locations of interest. Responsive to detecting an alarm event, local security monitoring device 12 may generate an indication of the detected alarm event for transmission to server 16, control station 30, and/or other devices. An alarm event may include one or more of a perimeter breach, unexpected and/or unauthorized movement, detection of a person or persons in an unauthorized area of the location of interest, detection of smoke, carbon monoxide and/or water, and/or other alarm events. In some implementations, the indication of the detected alarm event may be an electronic signal transmitted from local security monitoring device 12. In some implementations, the indication of the detected alarm event may include video information from camera(s) 49, sensor information from sensor (s) 48, and/or other information.

One or more cameras 49 may be configured to acquire visual information representing the location of interest (e.g., the interior and/or exterior areas of a house and/or other locations of interest). Any number of individual cameras 49 may be positioned at various locations in and/or around the location of interest. Cameras 49 may be configured such that the visual information includes views of exterior areas of the location of interest, one or more interior spaces (e.g., rooms) of the location of interest, and/or other areas to capture visual images of activities that occur at or near the location of interest, and/or in other areas. In some implementations, cameras 49 may include or be connected to a digital video recorder (DVR) system and/or other recording devices configured to record the visual information. In some implementations, the visual information may be received from a third party camera and/or digital video recorder (DVR) system.

Sensors 48 may be configured to generate output signals that convey information related to perimeter breaches, unexpected movement, detection of smoke and/or carbon monoxide and/or other alarm events for the location of interest. Sensors 48 may be configured to generate the output signals substantially continuously, at pre-determined intervals, and/or at other times. Sensors 48 may include proximity sensors (e.g., magnetic proximity sensors), motion sensors, thermal sensors, infrared sensors, pressure sensors, beam fence (e.g., laser fences) sensors, smoke sensors, carbon monoxide sensors, water sensors, and/or other sensors. Any number and/or type of sensors 48 may be placed in and/or around the location of interest.

In some implementations, detecting alarm events may include determining one or more alarm event parameters based on the security video information from cameras 49, the output signals from sensors 48, and/or other information; obtaining alarm event criteria that describe alarm events at the location of interest; and detecting an alarm event responsive to one or more alarm event parameters satisfying one or more alarm event criteria. The one or more alarm event parameters may include, for example determinations of whether doors/windows are open/broken/etc., detection of movement, determination a direction of movement, determining that a given barrier has been breached, determining a temperature, determining an amount of water, smoke and/or carbon dioxide present, and/or other parameters. These parameters may be compared to obtained criteria. The criteria may be obtained from an end user, for example, via user device 50, from central station 30, from server 16, and/or from other sources. The obtained criteria may include binary criteria (e.g., window/door open versus closed, movement versus no movement), thresholds (e.g., a temperature threshold, a water, smoke and/or carbon dioxide threshold level, a pressure level, etc.), relative criteria (e.g., movement in a first direction is permitted while movement in the opposite direction is not permitted), and/or other criteria. For example, local security monitoring device 12 may detect the heat signature of a person moving through a museum based on the output signals from a thermal sensor. Responsive to the person entering a restricted area (e.g., responsive to a determined location parameter satisfying restricted location criteria), local security monitoring device 12 may detect an alarm event and transmit an indication of the alarm event to server 16 and/or central station 30. As another example, local security monitoring device 12 may detect an alarm event responsive to determining that a window was unexpectedly opened (e.g., responsive to a magnetic contact parameter satisfying open window (lack of) magnetic contact criteria) and transmit an indication that the window was unexpectedly opened to central station 30 and/or server 16.

In some implementations, local security monitoring device 12 may be configured to transmit some and/or all of the visual information obtained by cameras 49, information generated by sensors 48, and/or other information to server 16 and/or central station 30 whether or not an alarm event has been detected. Local security monitoring device 12 may be configured to transmit such information substantially continuously, at pre-determined intervals, and/or at other times.

In some implementations, server 16 may include one or more of a processor 20, electronic storage 18, and/or other components. Server 16 may be configured to communicate with one or more user devices 50, central station 30, local security monitoring device 12, and/or other devices according to a client/server architecture, peer to peer architecture, and/or other architectures. Server 16 may include communication lines, or ports to enable the exchange of information with a network, central station 30, user device 50, local security monitoring device 12, and/or other computing platforms. Server 16 may include a plurality of processors, electronic storage, hardware, software, and/or firmware components operating together to provide the functionality attributed herein to server 16. For example, server 16 may be implemented by a cloud of computing platforms operating together as a system server. In some implementations, server 16, user device 50, central station 30, local security monitoring device 12, and/or other components of system 10 may be operatively linked via one or more electronic communication links. For example, such electronic communication links may be established, at least in part, via a network such as the internet and/or other networks. It will be appreciated that this is not intended to be limiting, and that the scope of this disclosure includes implementations in which servers, user devices, a central station, a local security monitoring device, and/or other devices may be operatively linked via some other communication media.

Processor 20 may be configured to provide information processing capabilities in server 16 and/or system 10. As such, processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some implementations, processor 20 may comprise a plurality of processing units. These processing units may be physically located within the same device (e.g., server 16, or processor 20 may represent processing functionality of a plurality of devices operating in coordination (e.g., server 16, user device 50, local security monitoring device 12).

Processor 20 may be configured to execute computer program components. The computer program components may be configured to enable an expert, a reviewer, an end user, and/or other users associated with user device 50, central station 30, and/or local security monitoring device 12 to interface with processor 20, and/or other components of system 10, and/or provide other functionality attributed herein to processor 20. The computer program components may include an indication component 22, a visual information component 24, a communication component 26, a storage component 28, and/or other components. Processor 20 may be configured to execute components 22, 24, 26, and/or 28 by software; hardware; firmware; some combination of software, hardware, and/or firmware; and/or other mechanisms for configuring processing capabilities on processor 20.

It should be appreciated that although components 22, 24, 26, and 28 are illustrated in FIG. 1 as being co-located within a single processing unit, in implementations in which processor 20 comprises multiple processing units, one or more of components 22, 24, 26, and/or 28 may be located remotely from the other components (e.g., such as within central station 30). The description of the functionality provided by the different components 22, 24, 26, and/or 28 described herein is for illustrative purposes, and is not intended to be limiting, as any of components 22, 24, 26, and/or 28 may provide more or less functionality than is described. For example, one or more of components 22, 24, 26, and/or 28 may be eliminated, and some or all of its functionality may be provided by other components 22, 24, 26, and/or 28. As another example, processor 20 may be configured to execute one or more additional components that may perform some or all of the functionality attributed below to one of components 22, 24, 26, and/or 28. In some implementations, one or more of components 22, 24, 26, and/or 28 may be executed by a processor incorporated in user device 50, central station 30, local security monitoring device 12, and/or other components of system 10.

Indication component 22 may be configured to make a determination of whether or not an alarm even has occurred for the location of interest. In some implementations, determining whether an alarm event has occurred for the location of interest includes receiving an indication that an alarm event has occurred from local security monitoring device 12 monitoring the location of interest. As described above, local security monitoring device 12 may transmit the indication that the alarm event has occurred to server 16 and central station 30 (e.g., at substantially the same time). In some implementations, the indication that an alarm event has occurred may be transmitted to central station 30 and then received by indication component 22 from local security monitoring device 12 via central station 30.

In some implementations, determining whether an alarm event has occurred for the location of interest may include performing one or more of the functions described above performed by local security monitoring device 12. For example, indication component 22 may perform some or all of determining one or more alarm event parameters; obtaining alarm event criteria that describe alarm events at the location of interest; and detecting an alarm event responsive to one or more alarm event parameters satisfying one or more alarm event criteria. In such implementations, local security monitoring device 12 may be configured to transmit the visual information from cameras 49, the output signals from sensors 48, obtained alarm event criteria, and/or other information to server 16 so that indication component 22 may determine whether an alarm event has occurred.

Visual information component 24 may be configured to receive the visual information from cameras 49, sensor information from sensors 48, and/or other information transmitted by local security monitoring device 12. Visual information component 24 may be configured to cause electronic recording of clips of security video information. Electronic recording of clips of security video information may be caused responsive to a determination that an alarm event has occurred. The clips of security video information may correspond to the one or more cameras monitoring the location of interest. An individual clip may comprise security video information from an individual camera 49 for a period of time that corresponds to a time of the determined alarm event. In some implementations, at least one clip includes security video information from a period of time that includes the time of the determined alarm event. In some implementations, visual information component 24 may be configured to cause electronic recording of clips of security video information for cameras associated with the detected alarm event. For example, if an intruder is detected in the back yard of a house but not inside, visual information component 24 may cause electronic recording of clips from cameras with a view of the back yard.

In some implementations, electronic recording of clips of security video information may include storing the one or more clips of security video information in non-transient electronic storage such as electronic storage 18 and/or other electronic storage in a first in first out (FIFO), and/or other storage regimes. In some implementations, an individual clip may comprise about a 5-20 second (though this range is not intended to be limiting) portion of video from an individual camera 49, for example. In some implementations, the clips may include a series of individual 5-20 second clips that together provide video information for a period of up to about 10 minutes (though this amount of time is not intended to be limiting). Communication component 26 may be configured to cause user device 50 to present the clips to an end user associated with user device 50. Communication component 26 may cause user device 50 to present clips to the end user in a selectable list of clips for the end user to review.

In some implementations, communication component 26 may cause user device 50 to present substantially real-time images to the end user for review. In some implementations, substantially real-time image information for the one or more cameras may be generated (e.g., by local security monitoring device 12) and then user device 50 may be caused by communication component 26 to present the real-time images based on the generated real-time image information. An individual substantially real-time image may be associated with an individual camera 49 and show at least a portion of the location of interest. In some implementations, the substantially real-time images presented to the end user may be streaming images from one or more cameras 49. In some implementations, the substantially real-time images presented to the end user may be updated up to about five times per second. As described above, this description of updating the substantially real-time images presented to the end user up to about five times per second is an example and is not intended to be limiting. The update speed may be determined and set by the system or manually. The speed may be based on system parameters or user preferences. The substantially real-time images presented to the end user may be updated and/or otherwise presented to the user at any rate that allows the system to function as described herein. In some implementations, the substantially real-time images presented to the end user are images updated responsive to requests from the end user (e.g., made via user device 50).

Communication component 26 may associate a pre-determined electronic (e.g., URL) address with the clips and/or the real-time images, wherein, responsive to receiving an indication that an alarm event has been detected, communication component 26 may post, and/or otherwise make available for viewing, the clips and/or the real-time images on a webpage and/or other communication forum that may be linked from this pre-determined electronic address. In some implementations, communication component 26 may cause user device 50 to present clips and or the real-time images to the end user for review by transmitting a push notification to user device 50 associated with the end user. The push notification may be an/or include a link to the webpage so that when the link is activated by the end user via user device 50, the clips and/or the real-time images are displayed to the end user by the webpage on user device 50.

In some implementations (as described below), communication component 26 may be configured such that the clips and/or real-time images may remain accessible at this pre-determined electronic address for a pre-determined amount of time. When the time expires the clips and/or real-time images may no longer viewable via this electronic address (URL link). However, the clips may still remain stored (e.g., as described below) on server 16 for archiving, evidentiary purposes, and/or other purposes, for example.

Communication component 26 may facilitate review of the clips and/or the real-time images by the reviewer using central station 30. Central station 30 may include one or more of a user interface 32, a processor 34, electronic storage 36, and/or other components. Central station 30 may be configured to receive an indication of the alarm event. Central station 30 may be configured to receive the indication of the alarm event directly from local security monitoring device 12, from local security monitoring device 12 via server 16, and/or by other methods. Responsive to receiving an indication of the alarm event, central station 30 may request and/or cause the reviewer to request the substantially real-time images and/or the clips using the pre-determined electronic address. For example, central station 30 may be pre-programmed with the electronic address of (the clips and/or real-time image information on) server 16. Responsive to receiving the indication of the alarm event, the reviewer may click on a video link indicator presented to the reviewer by a user interface (e.g., user interface 32 described below) of central station 30 to view clips and/or real-time images of the location of interest.

Communication component 26 may be configured to facilitate determination of whether the alarm event is false or verified. The determination may be made by the end user and/or the reviewer. The determination may be made by the end user and/or the reviewer based on the clips, the substantially real-time images, and/or other information. For example, the end user may review the clips and/or the real-time images directly using user device 50. As another example, as described above, communication component 26 may be configured to, responsive to a request from central station 30, provide the real-time image information and/or a selectable list of the clips for display to the reviewer by central station 30 such that the determination by the reviewer is based on the clips and/or the real-time image information. In some implementations, communication component 26 may be configured such that the selectable list of clips and/or the real-time image information may only be accessible to the reviewer via central station 30 for the pre-determined amount of time following the determined alarm event. This pre-determined amount of time may be determined at manufacture, set by the end user via user device 50, determined by server 16, determined by local security monitoring device 12, and/or determined in other ways. For example, the pre-determined amount of time may be up to about 30 minutes. This amount of time is just an example and is not intended to be limiting. The pre-determined amount of time may be any amount of time that allows system 10 to function as described herein.

In some implementations, communication component 26 and/or central station 30 may facilitate pan and tilt control of one or more cameras 49 by the end user using user device 50 and/or the reviewer using central station 30. Pan and tilt control of one or more cameras 49 may provide the end user and/or the reviewer with additional information on which to base a determination about whether or not the alarm event is false or verified. Communication component 26 and/or central station 30 may be configured such that pan and tilt control of cameras 49 is only available to the reviewer during the pre-determined amount of time.

Responsive to the user's and/or the reviewer's determination, communication component 26 may be configured to facilitate communication of whether the alarm event was determined to be false or verified. In some implementations, communication of the user's and/or reviewer's determination includes communication of verification information (e.g., included in a transmitted electronic signal) that indicates the determination by the end user and/or the reviewer of whether the determined alarm event is a false alarm event or a verified alarm event. The communication may be from user device 50 associated with the end user and/or from central station 30. The communication may be directed to server 16, central station 30 (e.g., if the communication is from user device 50), user device 50 (e.g., if the communication is from central station 30), local security monitoring device 12, a public emergency system (e.g., a 9-1-1 system), and/or other devices. For example, based on the clips and/or the real-time images, a reviewer may decide to call to request dispatch of assistance to the location of interest, or cancel the alarm.

Storage component 28 may be configured to allow an end user to direct electronic storage (e.g., in electronic storage 18, in electronic storage 56, and/or other electronic storage) of one or more of the clips, one or more substantially real-time images, and/or other information for a predetermined period of time. It should be noted that the predetermined period of time directed by the end user may be different than the amount of time (described above) that clips and/or real-time images are available to a reviewer via central station 30 for reviewer after an alarm event. In some implementations, storage component 28 may be configured, responsive to direction from the end user via user device 50 associated with the end user, to electronically store one or more clips and/or one or more real-time images on server 16 (e.g., in electronic storage 18). Storage component 28 may facilitate electronic storage of one or more clips in the selectable list of clips and/or one or more substantially real-time images by the reviewer using central station 30 so that the electronically stored clips and/or real-time images remain accessible to the reviewer and/or the end user. In some implementations, storage component 28 may facilitate emailing clips and/or real-time images from the reviewer using the central station to an end user. In some implementations, storage component 28 may facilitate emailing substantially real-time images from the reviewer using central station 30 to an end user. In some implementations, storage component 28 may facilitate manual clip and/or image recording (e.g., in electronic storage 18 of server 16) by the end user using user device 50. In some implementations, storage component 28 may facilitate manual clip and/or image recording by the reviewer using the central station during the pre-determined amount of time.

Figure 2A:
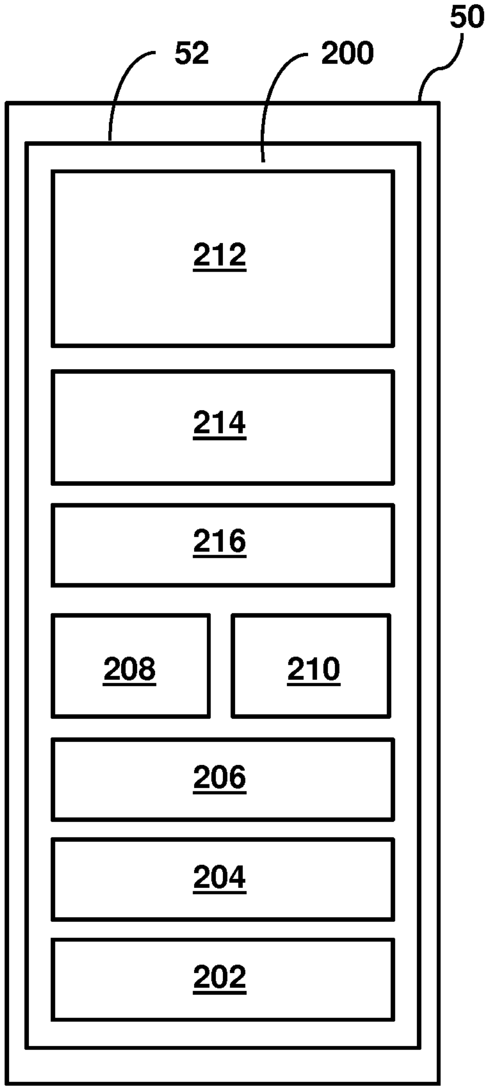
FIG. 2A schematically illustrates a view of a user interface presented to the end user via a user device associated with the end user.
Figure 2B:
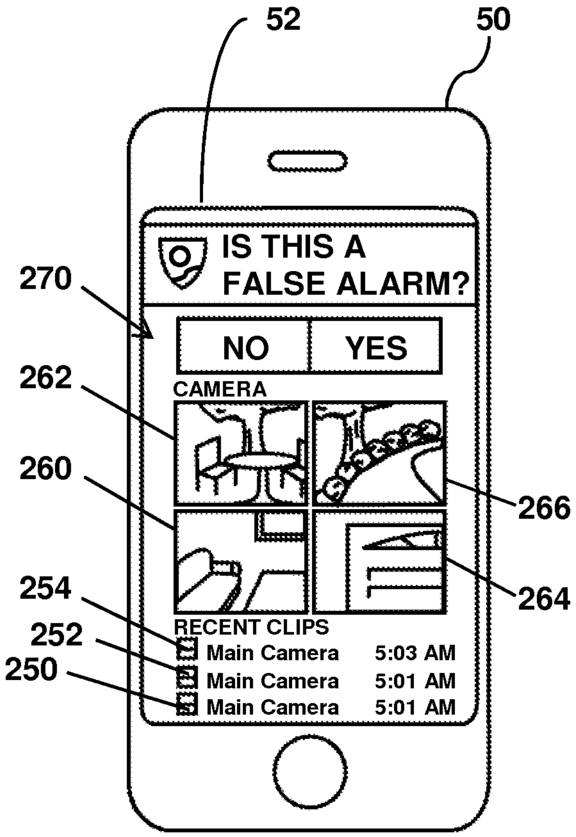
FIG. 2B illustrates a second view of the user interface presented to the end user via the user device associated with the end user.

By way of non-limiting example, FIG. 2A and FIG. 2B illustrate examples of clips and real-time images presented to the end user for review via a user interface 52 (shown in FIG. 1 and described herein) on user device 50. FIG. 2A schematically illustrates a view 200 of user interface 52. View 200 includes clip fields 202, 204, and 206; real-time image fields 208 and 210, verification field 212; camera control field 214; and manual recording field 216. FIG. 2B illustrates a second view 230 of user interface 52 presented to the end user via user device 50. FIG. 2B includes clip fields 250, 252, and 254; real-time image fields 260, 262, 264, and 266; and verification field 270. Clip fields 202, 204, 206, 250, 252, and 254 are configured to be selected by a user, and, responsive to selection, cause playback of the selected clip to the user for review on user device 50. Real-time image fields 208, 210, 260, 262, 264, and 266 are configured to display substantially real-time images of the location of interest to the user. Real-time image fields 208, 210, 260, 262, 264, and 266 may correspond to individual ones of cameras 49. Real-time image fields 208, 210, 260, 262, 264, and 266 may be selected by the end user and, responsive to selection, present a larger version of the selected image to the end user. Verification fields 212 and 270 may facilitate verification by the user of whether or not the alarm event is false or verified. For example, as shown in FIG. 2B, the end user may select “yes” if the alarm event is false, and “no” if the alarm event is verified. Camera control field 214 (FIG. 2A) may facilitate control of one or more cameras 49 (FIG. 1) to change the images shown to the end user in one or more of real-time image fields 208, 210, 260, 262, 264, and/or 266. Manual recording field 216 (FIG. 2A) may facilitate recording of one or more clips or images from cameras 49 by the end user. For example, the end user may view real-time image fields 208, 210, 260, 262, 264, and/or 266 and decide to record images in one or more of the fields using manual recording field 216.

Figure 3:
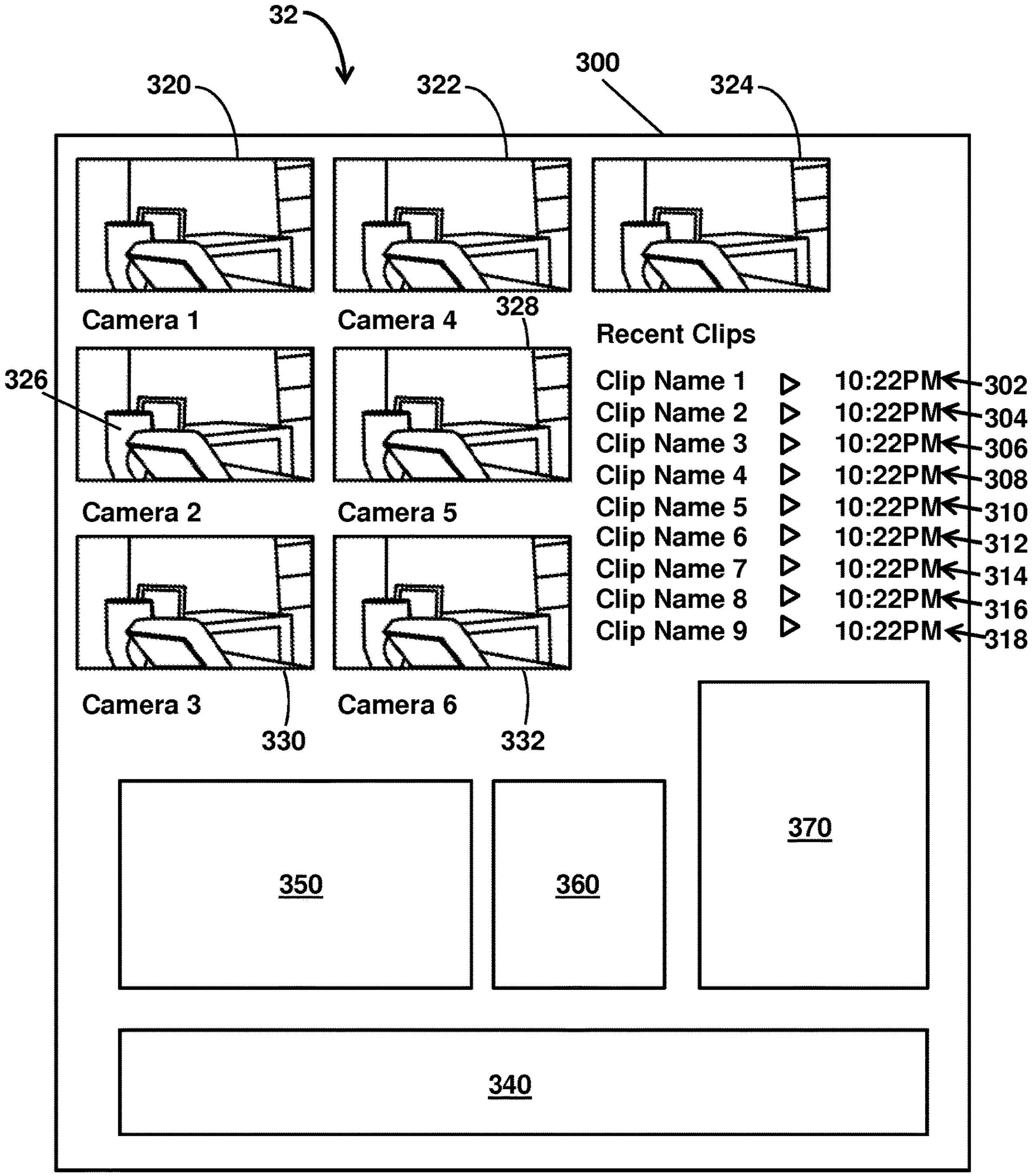
FIG. 3 illustrates a view of a user interface presented to a reviewer via a central station.

By way of second non-limiting example, FIG. 3 illustrates a view 300 of user interface 32 (shown in FIG. 1 and described herein) presented to a reviewer via central station 30 (shown in FIG. 1). View 300 includes clip fields 302, 304, 306, 308, 310, 312, 314, 316, and 318; real-time image fields 320, 322, 326, 328, 330, and 332; verification field 340; camera control field 350; manual recording field 360; and email/communication field 370. Clip fields 302, 304, 306, 308, 310, 312, 314, 316, and 318 are configured to be selected by the reviewer, and, responsive to selection, cause playback of the selected clip to the reviewer in clip review field 324 via central station 30. Real-time image fields 320, 322, 326, 328, 330, and 332 may be configured to display substantially real-time images of the location of interest to the reviewer. Verification field 340 may facilitate verification by the reviewer of whether or not an alarm event is false or verified. Camera control field 350 may facilitate control of one or more cameras 49 (FIG. 1) to change the images shown to the reviewer in one or more of the real-time image fields. Manual recording field 360 may facilitate recording of one or more clips from cameras 49 by the end user. Email/communication field 370 may facilitate email and/or communication of clips, real-time images and/or other information from the reviewer and/or central station 30 to user device 50 and/or other components of system 10. As described above, clip fields 302, 304, 306, 308, 310, 312, 314, 316, and 318; real-time image fields 320, 322, 326, 328, 330, and 332; verification field 340; camera control field 350; manual recording field 360; and email/communication field 370 may be viewable to the reviewer only responsive to detection of an alarm event, and only for a limited period of time that corresponds to the alarm event.

It should be noted that the number, type, and/or orientation of the fields presented in the views of the user interfaces in FIGS. 2A, 2B, and/or 3 are not intended to be limiting. The views of the user interfaces may include any number, type, and/or orientation of any field that allows system 10 to function as described herein.

Returning to FIG. 1, user device 50 may be associated with the end user and/or other users. In some implementations, user device 50 may include one or more of a user interface 52, a processor 54, electronic storage 56, and/or other components. In some implementations, user device 50 may be configured to communicate with server 16, central station 30, local security monitoring device 12, other computing platforms, and/or other devices according to peer-to-peer architecture, client/server architecture, and/or other architectures. User device 50 may include communication lines, and/or ports to enable the exchange of information with a network, other computing platforms, and/or other devices. In some implementations, communication between user device 50 and/or other components of system 10 may be wireless and/or via wires. For example, user device 50 may communicate with server 16, central station 30, and/or local security monitoring device 12 wirelessly via a Wi-Fi network, via Bluetooth® technology, via a network such as the internet, and/or other wireless methods.

Processor 34 in central station 30, processor 54 in user device 50, and/or processor 44 in local security monitoring device 12 may be configured to provide information processing capability in the individual components of system 10 in which they are included, and/or in system 10 as a whole. As such, processors 34, 44, and/or 54 may include one or more of a digital processor, an analog processor, a digital circuit designed to process information, an analog circuit designed to process information, a state machine, and/or other mechanisms for electronically processing information. Although processors 34, 44, and/or 54 are shown in FIG. 1 as single entities, this is for illustrative purposes only. In some implementations, processor 34, 44, and/or 54 individually include a plurality of processing units. These processing units may be physically located within the same device (e.g., within central station 30, user device 50, and/or local security monitoring device 12), or processors 34, 44, and/or 54 may represent processing functionality of a plurality of devices operating in coordination. Processors 34, 44, and/or 54 may be configured to enable an expert and/or user associated with user device 50, central station 30, and/or local security monitoring device 12 to interface with server 16 and/or processor 20, and/or other devices, and/or provide other functionality attributed herein to user device 50, central station 30, and/or local security monitoring device 12.

In some implementations, user interfaces 32, 42, and 52 may be configured to provide an interface between central station 30, user device 50, and/or local security monitoring device 12, and an end user, a reviewer, and/or other users through which the end user, the reviewer, and/or the other users may provide information to and receive information from central station 30, user device 50, and/or local security monitoring device 12. This enables data, cues, results, and/or instructions and any other communicable items, collectively referred to as "information," to be communicated between the end user, the reviewer, and/or other users and central station 30, user device 50, local security monitoring device 12, and/or other components of system 10. Examples of interface devices suitable for inclusion in user interfaces 32, 42, and/or 52 comprise a touch screen, a keypad, buttons, switches, a keyboard, knobs, levers, a display screen, speakers, a microphone, an indicator light, an audible alarm, a printer, a computer mouse, and/or other interface devices. In some implementations, user interfaces 32, 42, and/or 52 individually comprise a plurality of separate interfaces (e.g., a display screen, a mouse, and a keyboard). In some implementations, user interfaces 32, 42, and/or 52 comprise one interface (e.g., a touchscreen, a keypad, etc.) that is provided integrally with central station 30, user device 50, and/or local security monitoring device 12.

It is to be understood that other communication techniques, either hard-wired or wireless, are also contemplated by the present disclosure as user interfaces 32, 42, and/or 52. For example, the present disclosure contemplates that user interfaces 32, 42, and/or 52 may be integrated with a removable storage interface provided by electronic storage 36, 46, and/or 56. In this example, information may be loaded into system 10 from removable storage (e.g., a smart card, a flash drive, a removable disk, etc.) that enables the end user to customize the implementation of system 10 (e.g., adjust how long clips/images are available to a reviewer). Other exemplary input devices and techniques adapted for use as user interfaces 32, 42, and/or 52 comprise, but are not limited to, an RS-232 port, RF link, an IR link, modem (telephone, cable or other). In short, any technique for communicating information with system 10 is contemplated by the present disclosure as user interfaces 32, 42, and/or 52.

In some implementations, electronic storage 18, 36, 46, and/or 56 may comprise electronic storage media that electronically stores information in system 10. Electronic storage 18, 36, 46, and/or 56 may be configured to store software algorithms, clips, images, information determined by processors 20, 34, 44, and/or 54, information received via user interfaces 32, 42, and/or 52, and/or other information that enables system 10 to function as described herein. The electronic storage media of electronic storage 18, 36, 46, and/or 56 may comprise one or both of system storage that is provided integrally (i.e., substantially non-removable) with one or more components of system 10 and/or removable storage that is removably connectable to one or more components of system 10 via, for example, a port (e.g., a USB port, a firewire port, etc.) or a drive (e.g., a disk drive, etc.). Electronic storage 18, 36, 46, and/or 56 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 18, 36, 46, and/or 56 may be (in whole or in part) a separate component within one or more components of system 10, or electronic storage 18, 36, 46, and/or 56 may be provided (in whole or in part) integrally with one or more other components of system 10 (e.g., user interfaces 32, 42, and/or 52).

Figure 4:
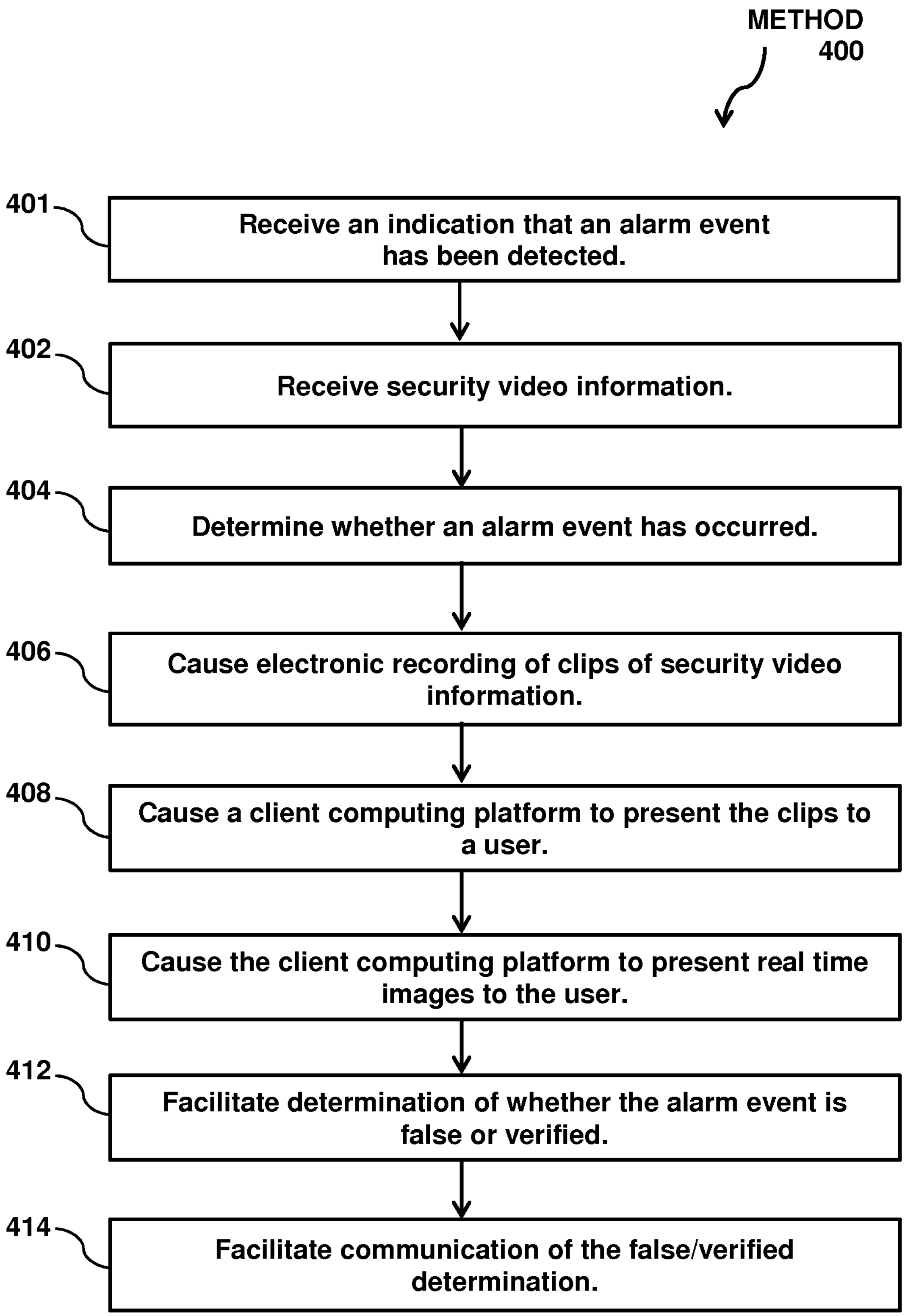
FIG. 4 illustrates a method for facilitating remote verification of alarm events by an end user.
Figure 5:
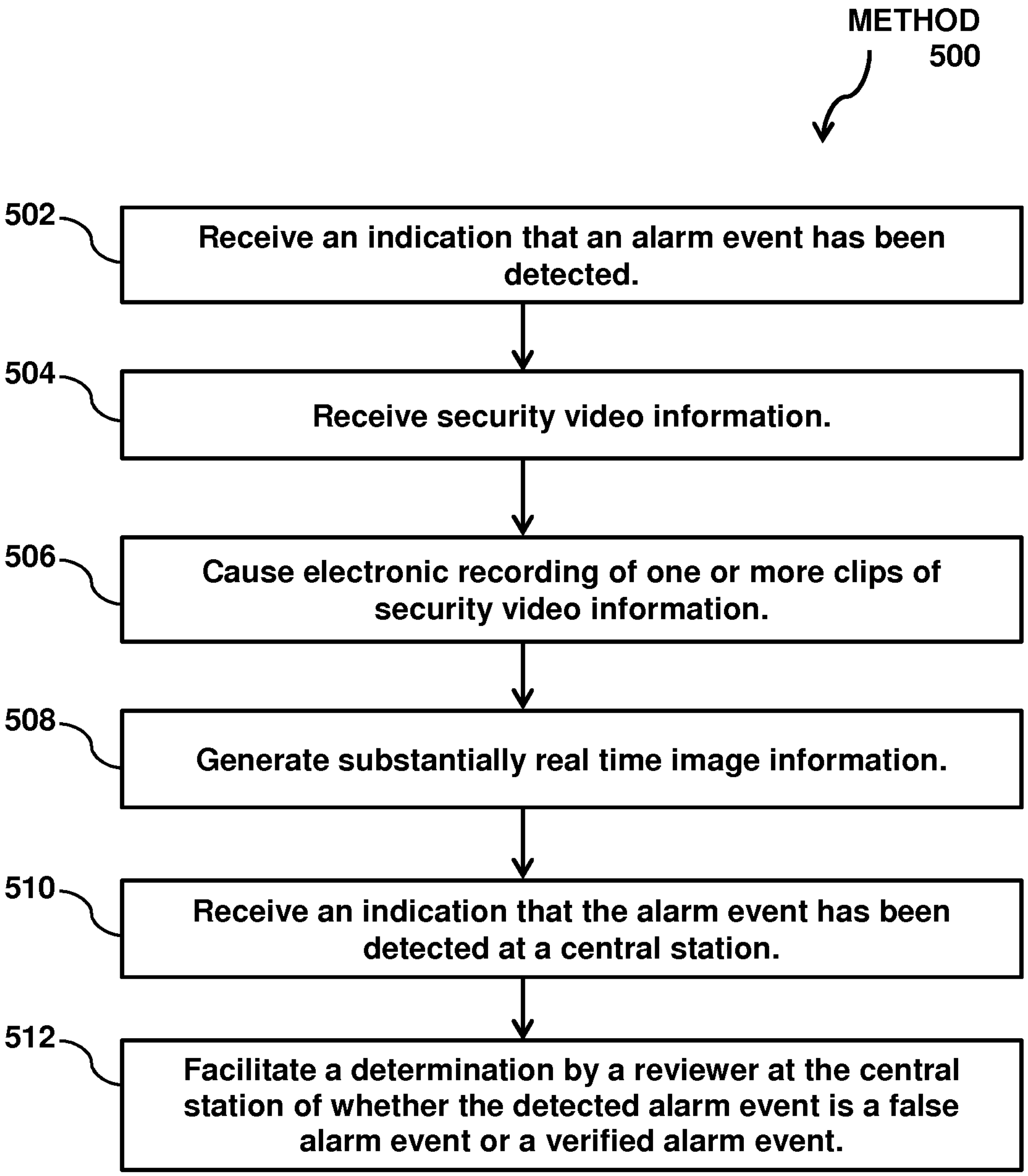
FIG. 5 illustrates a method for facilitating verification of alarm events with a verification system at a central station.

FIG. 4 illustrates a method 400 for facilitating remote verification of alarm events by an end user. FIG. 5 illustrates a method 500 for facilitating verification of alarm events with a verification system. The verification system may include one or more of a server, a central station, and/or other components. The server may be located remotely from the central station and/or other components of the system. The operations of method 400 and/or 500 presented below are intended to be illustrative. In some implementations, method 400 and/or 500 may be accomplished with one or more additional operations not described, and/or without one or more of the operations discussed. Additionally, the order in which the operations of method 400 and/or 500 are respectively illustrated in FIG. 4 and/or FIG. 5 and described below is not intended to be limiting.

In some implementations, method 400 and/or 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 and/or 500 in response to instructions stored electronically on an electronic storage medium. The one or more processing devices may include one or more devices configured through hardware, firmware, and/or software to be specifically designed for execution of one or more of the operations of method 400 and/or 500.

Referring to FIG. 4 and method 400, at an operation 401, an indication that an alarm event has been detected may be received. The alarm event may have been detected for the location of interest. In some implementations, operation 401 may include detecting the alarm event and transmitting the indication that the alarm event has been detected with a local security monitoring device located at the location of interest. The indication than an alarm event has been detected may be transmitted from the local security monitoring device to the server and/or the central station. The local security monitoring device may include one or more cameras. In some implementations, the indication that the alarm event has been detected may be transmitted to the server via the central station. In some implementations, the indication that the alarm event has been detected may be transmitted to the central station via the server. In some implementations, the server may detect the alarm event and transmit the indication to the central station, the local security monitoring device, and/or other devices. In some implementations, operation 401 may be performed by a local security monitoring device and/or server that are the same as or similar to local security monitoring device 12 and/or server 16 (shown in FIG. 1 and described herein).

At an operation 402, security video information may be received. The security video information may be received from one or more cameras monitoring a location of interest and/or other sources. The security video information may be received by the local security monitoring device 12. In some implementations, operation 402 may be performed by a server that is the same as or similar to server 16 (shown in FIG. 1 and described herein).

At an operation 404, a determination of whether or not an alarm even has occurred may be made. Whether or not an alarm event has occurred may be determined for the location of interest. In some implementations, determining whether an alarm event has occurred for the location of interest includes receiving an indication that an alarm event has occurred from a security system monitoring the location of interest. In some implementations, determining whether an alarm event has occurred for the location of interest includes determining one or more alarm event parameters based on the security video information from the one or more cameras; obtaining alarm event criteria that describe alarm events at the location of interest; and detecting an alarm event responsive to one or more alarm event parameters satisfying one or more alarm event criteria. In some implementations, operation 404 may be performed by a server that is the same as or similar to server 16 (shown in FIG. 1 and described herein). In some implementations, operation 404 may be performed at least in part by a local security monitoring device that is the same as or similar to local security monitoring device 12 (shown in FIG. 1 and described herein).

At an operation 406, electronic recording of clips of security video information may be caused. Electronic recording of clips of security video information may be caused responsive to a determination that an alarm event has occurred. The clips of security video information may correspond to the one or more cameras monitoring the location of interest. An individual clip may comprise security video information from an individual camera for a period of time that corresponds to a time of the determined alarm event. In some implementations, at least one clip includes security video information from a period of time that includes the time of the determined alarm event. In some implementations, electronic recording of clips of security video information may include storing the one or more clips of security video information in non-transient electronic storage. In some implementations, operation 406 may be performed by a server that is the same as or similar to server 16 (shown in FIG. 1 and described herein).

At an operation 408, a user device may be caused to present the clips to an end user. The user device may be configured to present clips to the end user in a selectable list of clips for the end user to review. In some implementations, operation 408 may include allowing an end user to direct electronic storage of one or more of the clips in the selectable list for a predetermined period of time. In some implementations, operation 408 may be performed by a server that is the same as or similar to server 16 (shown in FIG. 1 and described herein).

At an operation 410, the user device may be caused to present substantially real-time images to the end user for review. In some implementations, substantially real-time image information for the one or more cameras may be generated and then the user device may be caused to present the real-time images based on the generated real-time image information. An individual substantially real-time image may be associated with an individual camera and show at least a portion of the location of interest. In some implementations, the substantially real-time images presented to the end user are streaming images from the one or more cameras. In some implementations, the substantially real-time images presented to the end user are updated up to about five times per second (as describe above, this is an example and is not intended to be limiting). In some implementations, the substantially real-time images presented to the end user are images updated responsive to requests from the end user. In some implementations, operation 410 may include allowing the end user to direct electronic storage of one or more of the substantially real-time images for a predetermined period of time. In some implementations, operation 410 may be performed by a server that is the same as or similar to server 16 (shown in FIG. 1 and described herein).

At an operation 412, determination of whether the alarm event is false or verified may be facilitated. The determination may be made by the end user. The determination may be made by the end user based on the clips, the substantially real-time images, and/or other information. In some implementations, operation 412 may be performed by a server that is the same as or similar to server 16 (shown in FIG. 1 and described herein).

At an operation 414, communication of whether the alarm event was determined to be false or verified may be facilitated. In some implementations, operation 414 may include communication of verification information that indicates the determination by the end user of whether the determined alarm event is a false alarm event or a verified alarm event. The communication may be from the user device associated with the end user. The communication may be directed to the server, the control panel, the central station, and/or other devices. In some implementations, operation 414 may be performed by a server that is the same as or similar to server 16 (shown in FIG. 1 and described herein).

Referring to FIG. 5 and method 500, at an operation 502, an indication that an alarm event has been detected may be received. The alarm event may have been detected for the location of interest. In some implementations, operation 502 may include detecting the alarm event and transmitting the indication that the alarm event has been detected with a local security monitoring device located at the location of interest. The indication than an alarm event has been detected may be transmitted from the local security monitoring device to the server and/or the central station. The local security monitoring device may include one or more cameras. In some implementations, the indication that the alarm event has been detected may be transmitted to the server via the central station. In some implementations, the indication that the alarm event has been detected may be transmitted to the central station via the server. In some implementations, the server may detect the alarm event and transmit the indication to the central station, the local security monitoring device, and/or other devices. In some implementations, operation 502 may be performed by a server that is the same as or similar to server 16 (shown in FIG. 1 and described herein).

At an operation 504, security video information may be received. The security video information may be associated with the alarm event and may be from one or more of the cameras monitoring the location of interest. Operation 504 may be performed by a server that is the same as or similar to server 16 (shown in FIG. 1 and described herein).

At an operation 506, electronic recording of one or more clips of security video information may be caused. Operation 506 may include electronic recording of one or more clips of security video information from the one or more cameras. An individual clip may comprise security video information from an individual camera for a period of time that corresponds to a time of the alarm event. Operation 506 may be performed by a server that is the same as or similar to server 16 (shown in FIG. 1 and described herein).

At an operation 508, substantially real-time image information may be generated. The image information may be from the one or more cameras monitoring the location of interest. Operation 508 may be performed by a server that is the same as or similar to server 16 (shown in FIG. 1 and described herein).

At an operation 510, an indication that the alarm event has been detected may be received at the central station. In some implementations, the server may have a pre-determined electronic address, wherein, responsive to receiving the indication that the alarm event has been detected, the central station may request the real-time image information and the selectable list of the clips using the pre-determined electronic address. Operation 510 may be performed by a central station that is the same as or similar to central station 30 (shown in FIG. 1 and described herein).

At an operation 512, a determination by a reviewer at the central station of whether the detected alarm event is a false alarm event or a verified alarm event may be facilitated. In some implementations, the server may be configured to, responsive to a request from the central station, provide the real-time image information and a selectable list of the clips for display to the reviewer by the central station such that the determination by the reviewer is based on the clips and the real-time image information. The selectable list of clips and the real-time image information may only be accessible to the reviewer via the central station for a pre-determined amount of time following the determined alarm event. In some implementations, operation 512 may include facilitating pan and tilt control of the one or more cameras by the reviewer using the central station during the pre-determined amount of time.

In some implementations, operation 512 may include facilitating electronic storage of one or more clips in the selectable list of clips by the reviewer using the central station so that the electronically stored clips remain accessible to the reviewer after the pre-determined amount of time expires. In some implementations, operation 512 may include facilitating emailing clips from the reviewer using the central station to an end user. In some implementations, operation 512 may include, responsive to direction from the end user via a user device associated with the end user, electronically storing one or more clips on the server. In some implementations, operation 512 may include facilitating emailing substantially real-time images from the reviewer using the central station to an end user. In some implementations, operation 512 may include, responsive to direction from the end user via a user device associated with the end user, electronically storing one or more real-time images on the server. In some implementations, operation 512 may include facilitating manual clip recording by the reviewer using the central station during the pre-determined amount of time. In some implementations, operation 512 may include facilitating manual image recording by the reviewer using the central station during the pre-determined amount of time. In some implementations, operation 512 may be performed by a central station and/or a server that are the same as or similar to central station 30 and/or server 16 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate verification of alarm events, the system comprising:
- a server configured to:
  - receive an indication that an alarm event has been detected for a location of interest;
  - receive security video information associated with the alarm event from one or more cameras monitoring the location of interest;
  - cause electronic recording of one or more clips of security video information from the one or more cameras, wherein each individual clip comprises security video information from an individual camera for a period of time that corresponds to a time of the alarm event but does not include real-time image information;
  - in response to the indication that an alarm event has been detected, generate live streaming image information for the one or more cameras, wherein the live streaming information is different from the one or more recorded clips of security video information;
  - transmit to a central station:
    - the indication that an alarm event has been detected and:
      - the one or more clips of security video information from the one or more cameras; and
      - the live streaming image information for the one or more cameras; and
      - provide a selectable list of the one or more clips, wherein each clip is associated with an individual camera and a time interval surrounding the alarm event;
      - restrict reviewer access to the selectable list and the live streaming image information to a pre-determined time period following the alarm event; and
      - responsive to direction from the end user device, electronically store one or more of the clips and/or the live streaming image information;
- a central station configured to:
  - receive from the server the indication that an alarm event has been detected;
  - receive from the server the one or more clips of security video information from the one or more cameras and the live streaming image information for the one or more cameras and present the one or more clips of security video information to a reviewer at the central station;

in response to the indication that an alarm event has been detected, request the server to transmit to an end user device the indication that an alarm event has been detected, the one or more clips of security video information from the one or more cameras, and the live streaming image information for the one or more cameras; and receive from the end user device a determination of whether the detected alarm event is a false alarm event or a verified alarm event; and provide pan and tilt control of one or more of the cameras by the reviewer during the predetermined time period; and facilitate manual recording of additional video clips or images by the reviewer during the predetermined time period;

an end user device configured to:

receive from the server the indication that an alarm event has been detected and present to an end user the one or more clips of security video information from the one or more cameras and the live streaming image information for the one or more cameras; and receive from the end user a determination of whether the detected alarm event is a false alarm event or a verified alarm event; wherein the end user device is located remotely from the server and the central station.

2. The system of claim 1, further comprising a local security monitoring device located at the location of interest configured to detect the alarm event and transmit the indication that the alarm event has been detected to the server and the central station, the local security monitoring device including the one or more cameras.

3. The system of claim 2, wherein the local security monitoring device is configured to transmit the indication that the alarm event has been detected to the server via the central station.

4. The system of claim 2, wherein the local security monitoring device is configured to transmit the indication that the alarm event has been detected to the central station via the server.

5. The system of claim 1, wherein the server is configured to facilitate electronic storage of the one or more clips by the reviewer using the central station so that the electronically stored clips remain accessible to the reviewer after a pre-determined amount of time expires.

6. The system of claim 1, wherein the server is configured to facilitate electronic storage of one or more substantially real-time images by the reviewer using the central station so that the electronically stored images remain accessible to the reviewer after a pre-determined amount of time expires.

7. The system of claim 1, wherein the server is configured to facilitate emailing clips from the reviewer using the central station to an end user.

8. The system of claim 7, wherein the server is configured, responsive to direction from the end user via a user device associated with the end user, to electronically store one or more clips on the server.

9. The system of claim 1, wherein the server is configured to facilitate emailing substantially real-time images from the reviewer using the central station to an end user.

10. The system of claim 9, wherein the server is configured, responsive to direction from the end user via a user device associated with the end user, to electronically store one or more real-time images on the server.

11. The system of claim 1, wherein the server is configured to facilitate pan and tilt control of the one or more cameras by the reviewer using the central station during a pre-determined amount of time.

12. The system of claim 1, wherein the server has a pre-determined electronic address, and wherein, responsive to receiving the indication that the alarm event has been detected, the central station requests real-time image information and a selectable list of the clips using the pre-determined electronic address.

13. The system of claim 1, wherein the server is configured to facilitate manual clip recording by the reviewer using the central station during a pre-determined amount of time.

14. The system of claim 1, wherein the server is configured to facilitate manual image recording by the reviewer using the central station during a pre-determined amount of time.

15. The system of claim 1, wherein the server is located remotely from the central station.

16. A method for facilitating verification of alarm events with a verification system, the system comprising a server, a central station, and an end user device, the method comprising:

receiving, with the server, an indication that an alarm event has been detected for a location of interest;

receiving, with the server, security video information associated with the alarm event from one or more cameras monitoring the location of interest;

causing, with the server, electronic recording of one or more clips of security video information from the one or more cameras, wherein each individual clip comprises security video information from an individual camera for a period of time that corresponds to a time of the alarm event but does not include real-time image information;

generating, with the server, in response to the indication that an alarm event has been detected, live streaming image information for the one or more cameras, wherein the live streaming image information is different from the one or more recorded clips of security video information;

providing, with the server, a selectable list of the one or more clips, each clip associated with an individual camera and a time interval surrounding the alarm event;

receiving, with the central station, the indication that the alarm event has been detected, the one or more clips of security video information from the one or more cameras, and the live streaming image information for the one or more cameras and present the one or more clips of security video information to a reviewer at the central station;

in response to the indication that an alarm event has been detected, requesting the server to transmit to an end user device:

the indication that an alarm event has been detected:

the one or more clips of security video information from the one or more cameras, and the live streaming image information for the one or more cameras; and receiving from the end user device a determination of whether the detected alarm event is a false alarm event or a verified alarm event;

receiving, with an end user device, the indication from the server that an alarm event has been detected and presenting to an end user the one or more clips of security video information from the one or more cameras and the live streaming image information for the one or more cameras; and receive, with the end user device, a determination from the end user of whether the detected alarm event is a false alarm event or a verified alarm event; wherein the end user device is located remotely from the server and the central station;

further comprising restricting reviewer access to the selectable list of clips and the live streaming image information to a predetermined time period following the alarm event;

further comprising facilitating, with the central station, pan and tilt control of one or more of the cameras by the reviewer during the predetermined time period;

further comprising facilitating, with the central station, manual recording of additional video clips or images by the reviewer during the predetermined time period;

and further comprising, with the server, electronically storing one or more of the clips and/or the live streaming image information responsive to direction from the end user device.

17. The method of claim 16, further comprising detecting the alarm event and transmitting the indication that the alarm event has been detected, with a local security monitoring device located at the location of interest, to the server and the central station, the local security monitoring device including the one or more cameras.

18. The method of claim 17, further comprising transmitting the indication that the alarm event has been detected to the server via the central station.

19. The method of claim 17, further comprising transmitting the indication that the alarm event has been detected to the central station via the server.

20. The method of claim 16, further comprising facilitating, with the server, electronic storage of one or more clips in a selectable list of clips by the reviewer using the central station so that the electronically stored clips remain accessible to the reviewer after a pre-determined amount of time expires.

21. The method of claim 16, further comprising facilitating, with the server, electronic storage of one or more substantially real-time images by the reviewer using the central station so that the electronically stored images remain accessible to the reviewer after a pre-determined amount of time expires.

22. The method of claim 16, further comprising facilitating, with the server, emailing clips from the reviewer using the central station to an end user.

23. The method of claim 22, further comprising, responsive to direction from the end user via a user device associated with the end user, electronically storing one or more clips on the server.

24. The method of claim 16, further comprising facilitating, with the server, emailing substantially real-time images from the reviewer using the central station to an end user.

25. The method of claim 24, further comprising, responsive to direction from the end user via a user device associated with the end user, electronically storing one or more real-time images on the server.

26. The method of claim 16, further comprising facilitating, with the server, pan and tilt control of the one or more cameras by the reviewer using the central station during a pre-determined amount of time.

27. The method of claim 16, wherein the server has a pre-determined electronic address, and wherein, responsive to receiving the indication that the alarm event has been detected, the central station requests real-time image information and a selectable list of clips using the pre-determined electronic address.

28. The method of claim 16, further comprising facilitating, with the server, manual clip recording by the reviewer using the central station during a pre-determined amount of time.

29. The method of claim 16, further comprising facilitating, with the server, manual image recording by the reviewer using the central station during a pre-determined amount of time.

30. The method of claim 16, wherein the server is located remotely from the central station.

* * * * *